United States Patent Office 3,718,492
Patented Feb. 27, 1973

3,718,492
REFRACTORY ALUMINOUS CEMENTS
Alexandru I. Braniski, Teodor Ionescu, and Nicolae Deica, Bucharest, Rumania, assignors to Institutul de Cercetari Metalurgice, Bucharest, Rumania
No Drawing. Filed Mar. 30, 1970, Ser. No. 24,029
Claims priority, application Rumania, May 27, 1969, 60,093
Int. Cl. C04b 7/32
U.S. Cl. 106—104                                       3 Claims

ABSTRACT OF THE DISCLOSURE

The known refractory aluminous cements are made of alumina and limestone, e.g. of calcium aluminate $CaO.Al_2O_3$ and dialuminate $CaO_2.Al_2O_3$ (hydraulic re-impurities.

The high quality calcium and magnesia aluminous refractory cements of the present invention, are obtained from any kind of natural or artificial raw materials containing calcium, mixed with natural or artificial raw materials containing magnesia and in mixes in succession with natural or artificial hydrated or nonhydrated raw materials containing aluminum oxide in suitable stoichiometric proportions, by burning until sintering or melting, which assures spinel formation, $MgO-Al_2O_3$ (super-refractory constituent) and of calcium aluminate $CaO.Al_2O_3$ and dialuminate $CaO_2.Al_2O_3$ (hydraulic refractory constituents).

REFRACTORY ALUMINOUS CEMENTS

The present invention extends the principles of our copending application Ser. No. 706,764 filed Feb. 20, 1968 (now abandoned but replaced by continuation application Ser. No. 168,431 filed Aug. 2, 1971) and relating to refractory calcium and magnesium aluminous cements whose melting points are above 1699° C. owing to impurities content of the raw materials used.

The main invention titled "Refractory aluminous cements" uses as raw materials 30 to 50% dolomite and 70 to 50% calcined alumina with sintering or melting and slow cooling to obtain some refractory aluminous cements with said properties, owing to the formation of $MgO.Al_2O_3$ spinel, which is a super-refractory constituent, and of calcium monoaluminate $CaO.Al_2O_3$ and/or calcium dialuminate $CaO.2Al_2O_3$, which are refractory hydraulic constituents.

The present invention extends the principles of the parent application and consists in using, to obtain the same refractory aluminous cement clinkers, instead of dolomite: from mixtures of dolomite limestone or any other natural or artificial raw materials with a magnesium content as: magnesia, magnesium hydroxide (hydrated magnesia), magnesium carbonate or magnesium sulfate, mixed with natural or artificial raw materials containing calicum, as: lime, calcium hydroxide (hydrated lime), limestone, calcium carbonate or stoichiometrical sulfate, in correspondent stoichiometrical proportions, the calcined alumina being, in all or in part, substituted by un-burned alumina, hydrated alumina, natural hydrated alumina, or by any other kind of natural or artificial raw materials, hydrated or unhydrated, containing alumina $Al_2O_3$, as: bauxite, calcined bauxite, boekmite, hydrargilite, bayerite and corundum, in corresponding stoichiometrical proportions.

In this way it is possible to obtain, using the same proceedings as in the parent application refractory aluminous cement clinkers and further refractory aluminous cements having the same chemical, physical and mechanical properties as the refractory aluminous cement clinkers, and the refractory aluminous cements of said prior application.

Two examples of this invention are presented.

1st Example 9.5% magnesia, 23.5% limestone and 67.0% calcined alumina, are fine ground and mixed to make them homogenous. The raw materials have the following compositions:

Magnesia: 0.55% $SiO_2$, 0.87% $Al_2O_3$, 0.60% $Fe_2O_3$, 2.15% CaO, 95.83% MgO, together 100%.
Limestone: 0.32% $SiO_2$, 0.14% $Al_2O_3$, 0.11% $Fe_2O_3$, 54.63% CaO, 0.20% MgO, 44.20% loss on ignition, together 99.60%.
Calcined alumina: 0.04% $SiO_2$, 98.2% $Al_2O_3$, 0.2% $Fe_2O_3$, 0.3% CaO, 0.7% MgO, 0.62% $Na_2O+K_2O$ together 100.06%.

The above-mentioned mixture is burned in a conventional cement kiln until sintering (1580° C). After slow cooling, the resulting clinker is ground at the portland cement fineness.

The resulting refractory calcium and magnesium aluminous cement is an hydraulic binder with normal setting and rapid hardening. Its refractoriness is 1770° C., its compressive strength after 3 days 412 kg./cm.$^2$ and after 7 days 506 kg./cm.$^2$.

The mineralogical composition of the new refractory cement is 34.3% spinel $MgO.Al_2O_3$ (melting point 2135° C.) super-refractory constituent; 62.7% calcium dialuminate $CaO.2Al_2O_3$ (melting point 1750° C.) hydraulic constituent; 1.5% calcium monoaluminate $CaO.Al_2O_3$ (melting point 1600° C.) hydraulic constituent; 0.7% brownmillerite $4CaO.Al_2O_3.Fe_2O_3$ (melting point 1415° C.) secondary hydraulic constituent and 0.8% gehlenite $2CaO.Al_2O_3-SiO_2$ (melting point 1590° C.) secondary non-hydraulic constituent.

The refractory concrete resulting from 20% refractory calcium and magnesium aluminous cement and 80% refractory magnesite grog, with 16% <0.2 mm., 32% 0.5 to 2 mm. and 32% 2 to 5 mm. $\varphi$ grading, has the refractoriness of 1969° C. (S.K. 41/42).

2nd Example

50% dolomite and 50% calcined bauxite are fine ground and mixed to make them homogenous. The raw materials have the following chemical compositions:

Dolomite: 0.69% $SiO_2$, 0.73% $Al_2O_3$, 0.55% $Fe_2O_3$, 23.43% CaO, 21.46% MgO, 0.21% $Na_2O+K_2O$, 46.54% loss on ignition, together 99.61%.
Calcined bauxite: 5.60% $SiO_2$, 90.70% $Al_2O_3$, 1.40% $Fe_2O_3$, 1.10% CaO, 0.71% MgO, 0.01% $Na_2O+K_2O$, 0.10% loss on ignition, together 99.62%.

The above mentioned mixture is burned in a conventional cement kiln until fully sintering occurs at 1550° C. After slow cooling, the resulting cement clinker is ground at the portland cement fineness. The resulting cement is an hydraulic binder with normal setting, rapid hardening and 1610° C. refractoriness. Its compressive strength after 3 days is 382 kg./cm.$_2$ and after 7 days 481 kg./cm.$^2$.

The mineralogical composition of the resulting cement is the following: 41.9% spinel, super-refractory constituent, 36.5% calcium monoaluminate, hydraulic constituent, 6.9% calcium dialuminate, hydraulic constituent, 3.9% brownmillerite, secondary hydraulic constituent, and 10.8% monticellite, $CaO.MgO.SiO_2$ (melting point 1480° C.) secondary non-hydraulic constituent.

The refractory concrete resulting from 20% of the above mentioned refractory calcium and magnesium aluminous cement and 80% refractory white electro-corundum grog with 16% <0.2 mm., 32% 0.5 to 2 mm.

and 32% 2 to 5 mm. φ grading, has the refractoriness of 1830° C. (S.K. 37).

The present invention has the advantage of allowing sintering and melting at lower temperature and thus in proceedings used the costs are cutting down. The invention thus is a refractory calcium magnesium aluminous cement consisting essentially of about 34% to about 42% by weight $MgO \cdot Al_2O_3$ highly refractory spinel, about 63% by weight to about 6.9% by weight of $CaO \cdot 2Al_2O_3$ hydraulic calcium dialuminate and about 36.5% by weight to about 1.5% by weight of $CaO \cdot Al_2O_3$ hydraulic calcium monoaluminate.

We claim:

1. A refractory calcium magnesium aluminous cement consisting essentially of about 34% to about 42% by weight $MgO \cdot Al_2O_3$, highly refractory spinel, about 63% by weight to about 6.9% by weight of $CaO \cdot 2Al_2O_3$, hydraulic calcium dialuminate, and about 36.5% by weight to about 1.5% by weight of $CaO \cdot Al_2O_3$, hydraulic calcium monoaluminate.

2. The refractory cement defined in claim 1 which consists of 34.3% by weight $MgO \cdot Al_2O_3$, 62.7% by weight $CaO \cdot 2Al_2O_3$, 1.5% by weight $CaO \cdot Al_2O_3$, 0.7% $4CaO \cdot Al_2O_3 \cdot Fe_2O_3$ and 0.8% $2CaO \cdot Al_2O_3 = -SiO_2$.

3. The refractory cement defined in claim 1 which consists of 41.9% $MgO \cdot Al_2O_3$, 36.5% by weight $CaO \cdot Al_2O_3$, 6.9% by weight $CaO \cdot 2Al_2O_3$ and 10.8% by weight $CaO \cdot MgO \cdot SiO_2$ and 3.9% by weight $4CaO \cdot Al_2O_3 \cdot Fe_2O_3$.

References Cited

UNITED STATES PATENTS 3,303,037   2/1967   Klein _____ 106—104

OTHER REFERENCES

Levin et al.: Phase Diagrams for Ceramists, The American Ceramic Society, Columbus, Ohio, 1964, p. 209.

JAMES E. POER, Primary Examiner